United States Patent
Shimokawa et al.

(10) Patent No.: US 10,657,995 B2
(45) Date of Patent: May 19, 2020

(54) MAGNETIC DISK DEVICE AND METHOD

(71) Applicants: Kabushiki Kaisha Toshiba, Minato-ku, Tokyo (JP); Toshiba Electronic Devices & Storage Corporation, Minato-ku, Tokyo (JP)

(72) Inventors: Hideo Shimokawa, Tokyo (JP); Kenji Yoshida, Kamakura Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 16/296,633

(22) Filed: Mar. 8, 2019

(65) Prior Publication Data
US 2020/0090690 A1    Mar. 19, 2020

(30) Foreign Application Priority Data
Sep. 19, 2018    (JP) ................... 2018-175240

(51) Int. Cl.
  *G11B 15/02*    (2006.01)
  *G11B 5/55*    (2006.01)
  *G11B 19/04*    (2006.01)
  *G11B 5/48*    (2006.01)

(52) U.S. Cl.
  CPC .......... *G11B 5/5578* (2013.01); *G11B 5/4886* (2013.01); *G11B 5/553* (2013.01); *G11B 19/041* (2013.01)

(58) Field of Classification Search
  CPC ........... G06F 11/2069; G06F 2201/805; G11B 20/10527; G11B 20/1217; G11B 20/1803; G11B 5/00; G11B 5/92; G11B 15/02; G11B 19/02; G11B 5/54; G11B 5/59633; G11B 5/59638
  USPC ................. 360/22, 24, 55, 61, 62, 63, 75
  See application file for complete search history.

(56) References Cited

U.S. PATENT DOCUMENTS

| | | | |
|---|---|---|---|
| 6,437,937 B1 * | 8/2002 | Guo | G11B 5/5552 360/63 |
| 6,563,657 B1 | 5/2003 | Serrano et al. | |
| 7,102,842 B1 * | 9/2006 | Howard | G11B 5/5521 360/61 |
| 7,315,429 B2 * | 1/2008 | van Zyl | G11B 5/4806 360/61 |

(Continued)

FOREIGN PATENT DOCUMENTS

| | | |
|---|---|---|
| JP | 2007-328912 A | 12/2007 |
| JP | 2017-537423 A | 12/2017 |

*Primary Examiner* — Nabil Z Hindi
(74) *Attorney, Agent, or Firm* — White & Case LLP

(57) ABSTRACT

According to one embodiment, a magnetic disk device includes a magnetic disk including a plurality of tracks, first and second actuators, and a control circuit. The magnetic disk includes the plurality of tracks. The control circuit writes, in a first track by using the first actuator, second data having a size corresponding to a first number among the first data. In addition, the control circuit writes, in a second track by using the second actuator, third data having a size corresponding to a second number among the first data. Each of the first track and the second track is a track among the plurality of tracks. The first number is a number of writable sectors included in the first track. The second number is a number of writable sectors included in the second track. The third data is data received subsequent to the second data.

13 Claims, 13 Drawing Sheets

(56) References Cited

U.S. PATENT DOCUMENTS

| | | | | |
|---|---|---|---|---|
| 8,154,823 B2* | 4/2012 | Saga | ............... | G11B 5/596 |
| | | | | 360/62 |
| 9,032,167 B2* | 5/2015 | Sharma | ............ | G06F 12/06 |
| | | | | 360/63 |
| 9,836,369 B2* | 12/2017 | Macko | ......... | G11B 20/10527 |
| 2018/0226091 A1 | 8/2018 | Tan et al. | | |

* cited by examiner

MAGNETIC DISK DEVICE AND METHOD

CROSS-REFERENCE TO RELATED APPLICATIONS

This application is based upon and claims the benefit of priority from Japanese Patent Application No. 2018-175240, filed on Sep. 19, 2018; the entire contents of which are incorporated herein by reference.

FIELD

Embodiments described herein relate generally to a magnetic disk device and a method.

BACKGROUND

DETAILED DESCRIPTION

In general, according to one embodiment, a magnetic disk device includes a magnetic disk, a first magnetic head and a second magnetic head, a first actuator, a second actuator, a buffer memory, and a control circuit. The magnetic disk includes a plurality of tracks. The second magnetic head is different from the first magnetic head. The first actuator moves the first magnetic head. The second actuator moves the second magnetic head, and is an actuator different from the first actuator. The buffer memory receives first data from a host. The control circuit writes, in a first track by using the first actuator, second data having a size corresponding to a first number among the first data. In addition, the control circuit writes, in a second track by using the second actuator, third data having a size corresponding to a second number among the first data. The first track is a track among the plurality of tracks. The second track is, among the plurality of tracks, a track different from the first track. The first number is a number of writable sectors included in the first track. The second number is a number of writable sectors included in the second track. The third data is data received subsequent to the second data.

Exemplary embodiments of magnetic disk device and method will be described below in detail with reference to the accompanying drawings. The present invention is not limited to the following embodiments.

Embodiment

Figure 1:
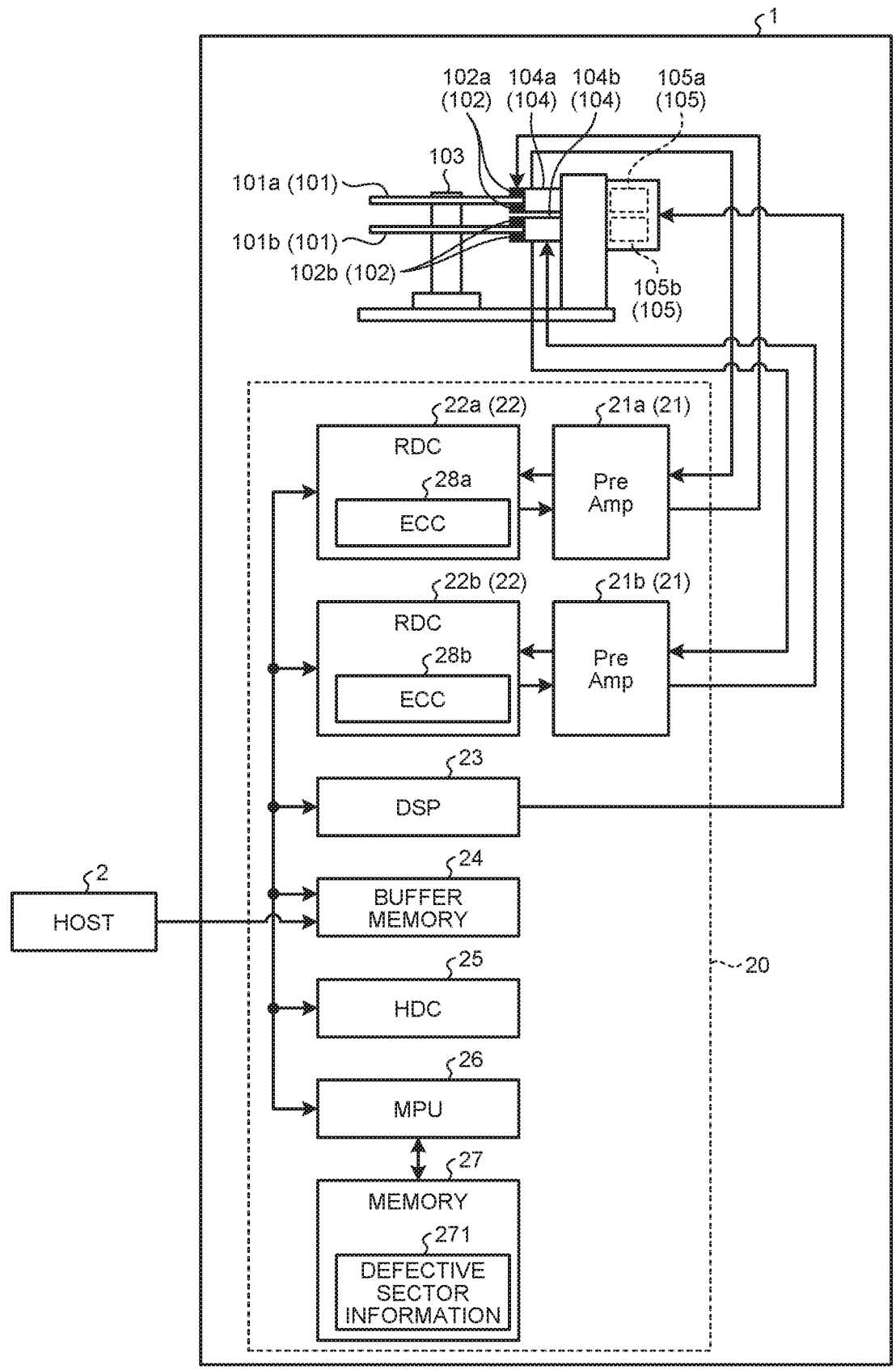
FIG. 1 is a diagram illustrating an example of a configuration of a magnetic disk device of an embodiment.

FIG. 1 is a diagram illustrating an example of a configuration of a magnetic disk device 1 of an embodiment. As illustrated in FIG. 1, the magnetic disk device 1 includes two magnetic disks 101, two pairs of magnetic heads 102 reading and writing data, two actuators 104 respectively moving different pairs of magnetic heads 102, and the like.

The two magnetic disks 101 include a magnetic disk 101a and a magnetic disk 101b. The two pairs of magnetic heads 102 include a pair of magnetic heads 102a and a pair of magnetic heads 102b. The two actuators 104 include a first actuator 104a and a second actuator 104b.

The two magnetic disks 101 are mounted at a certain pitch in an axis direction of a rotation axis 103 of a spindle motor, with respect to the rotation axis 103, and are integrally rotated at the same number of rotations, according to rotation driving of the rotation axis 103.

The number of magnetic disks 101 of the magnetic disk device 1 is not limited to 2.

Figure 2:
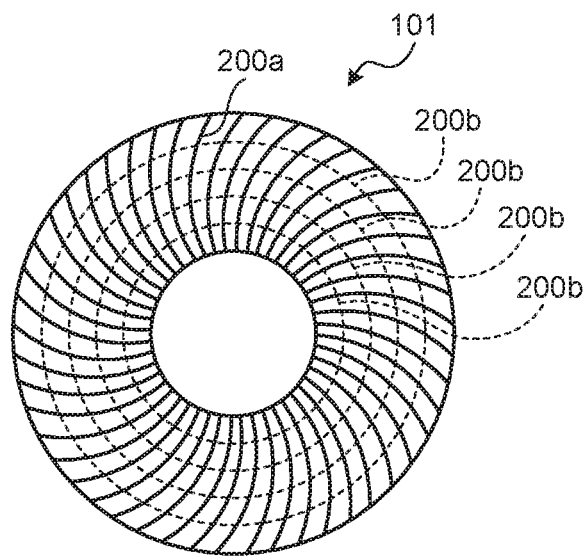
FIG. 2 is a diagram illustrating an example of a configuration of a magnetic disk of the embodiment.

FIG. 2 is a diagram illustrating an example of the configuration of the magnetic disk 101 of the embodiment. The magnetic disk 101 includes a magnetic body on both surfaces, and servo information is written in the magnetic disk 101 by a servo writer or the like prior to shipment. The servo information, for example, is a burst pattern. In FIG. 2, servo zones 200a which are radially arranged, are illustrated as an example of the arrangement of a servo zone in which the servo information is written. A plurality of concentric tracks 200b is provided at a certain pitch in a radial direction of the magnetic disk 101. A plurality of sectors is consecutively formed on the orbit of each of the tracks 200b. Each of the sectors includes a magnetic region, and data is freely rewritten in the sector.

As shown in FIG. 1, each of the magnetic heads 102a is disposed on each of a front surface and a rear surface of the magnetic disk 101a. Each of the magnetic heads 102a is attached to a tip end portion of the first actuator 104a. Each of the magnetic heads 102a executes writing of a signal corresponding to data and reading of a signal corresponding to the data, with respect to the magnetic disk 101a.

Each of the magnetic heads 102b is disposed on each of a front surface and a rear surface of the magnetic disk 101b. Two magnetic heads 102b are attached to a tip end portion of the second actuator 104b. Each of the magnetic heads 102b executes writing of data and reading of data, with respect to the magnetic disk 101b.

The magnetic disk device 1 includes two voice coil motors (VCM) 105. The two voice coil motors (VCM) 105 include a VCM 105a and a VCM 105b.

The first actuator 104a is rotatively driven around an axis 106 by the VCM 105a.

Figure 3:
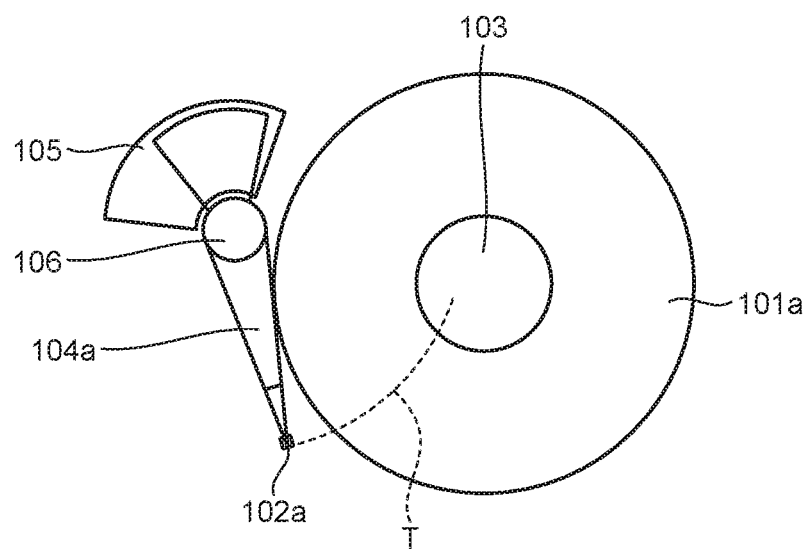
FIG. 3 is a diagram for describing a trajectory of a magnetic head of the embodiment.

FIG. 3 is a diagram for describing a trajectory of the magnetic head 102a of the embodiment. This drawing is a diagram viewing the magnetic disk 101a side in a direction where the axis 106 extends.

As illustrated in FIG. 3, the first actuator 104a is rotated by the VCM 105a in a range set around the axis 106, and thus, the magnetic head 102a can be moved on a broken line T. The magnetic head 102a is positioned on any track in the radial direction of the magnetic disk 101a.

The second actuator 104b is rotatively driven around the axis 106 by the VCM 105b. The second actuator 104b is also driven by the VCM 105b, as with the first actuator 104a. Accordingly, the magnetic head 102b can be moved on the same trajectory as the trajectory of the magnetic head 102a.

As shown in FIG. 1, the magnetic disk device 1 further includes a control circuit 20.

The control circuit 20 communicates with a host 2 through an interface such as a connection pin provided in a housing (not illustrated) of the magnetic disk device 1 for external connection, and controls each unit in the magnetic disk device 1 in accordance with to a command or the like from the host 2. The command includes a write command of instructing the writing of data, and a read command of instructing the reading of data.

For example, a server device, a mobile computer, a processor, and the like correspond to the host 2.

The control circuit 20 includes a preamplifier (PreAmp) 21 and a read channel circuit (RDC) 22 in each of the actuators 104. That is, the control circuit 20 includes a preamplifier 21a and an RDC 22a, corresponding to the first actuator 104a. In addition, the control circuit 20 includes a preamplifier 21b and an RDC 22b, corresponding to the second actuator 104b.

The control circuit 20 further includes a digital signal processor (DSP) 23, a buffer memory 24, a hard disk controller (HDC) 25, a micro processing unit (MPU) 26, and a memory 27.

The preamplifier 21a amplifies a signal read from the magnetic disk 101a by the magnetic head 102a (a read element), outputs the signal to be supplied to the RDC 22a. In addition, the preamplifier 21a amplifies the signal supplied from the RDC 22a, and supplies the signal to the magnetic head 102a (a write element).

The RDC 22a includes an error correction circuit (ECC) 28a executing encoding and decoding for error correction. The RDC 22a encodes data recorded in the magnetic disk 101a by the ECC 28a, and supplies the data after the encoding, to the preamplifier 21a, as a signal. In addition, the RDC 22a decodes the signal that is read from the magnetic disk 101a and is supplied from the preamplifier 21a, by the ECC 28a, and thus, executes the detection and the correction of an error included in the signal. Then, the RDC 22a outputs the signal after the error is corrected, to the HDC 25, as digital data.

An encoding and decoding method for error correction, which is used by the ECC 28a, is not limited to a specific method. In an example, low density parity check (LDPC) can be adopted. In addition, the size of a data block, which is encoding/decoding unit of the ECC 28a, is not limited to a specific size. The ECC 28a may execute encoding/decoding in sector units, or may execute encoding/decoding in track units. The ECC 28a may execute encoding/decoding in sector units, and may execute encoding/decoding in track units. In addition, the encoding and decoding for error correction, may be executed by the MPU 26.

The preamplifier 21b amplifies a signal read from the magnetic disk 101b by the magnetic head 102b (a read element), outputs the signal to be supplied to the RDC 22b. In addition, the preamplifier 21b amplifies the signal supplied from the RDC 22b, and supplies the signal to the magnetic head 102b (a write element).

The RDC 22b includes an ECC 28b. The RDC 22b encodes data recorded in the magnetic disk 101b by the ECC 28b, and supplies the data after the encoding to the preamplifier 21b, as a signal. In addition, the RDC 22b decodes the signal that is read from the magnetic disk 101b and is supplied from the preamplifier 21b, by the ECC 28b, and thus, executes the detection and the correction of an error included in the signal. Then, the RDC 22b outputs the signal after the error is corrected, to the HDC 25, as digital data.

An encoding and decoding method for error correction, which is used by the ECC 28b, is not limited to a specific method. The encoding and decoding method for error correction, which is used by the ECC 28b, for example, is the same method as that used by the ECC 28a.

The DSP 23 controls the spindle motor, and the VCMs 105a and 105b, and performs positioning control such as seeking and following. Specifically, the DSP 23 demodulates servo information obtained from the signal from the RDC 22, and calculates a VCM driving command value according to an error between a position demodulated from the servo information and a target position, and thus, performs the positioning control.

The buffer memory 24 is used as a buffer of data that is transmitted and received with respect to the host 2. That is, data received from the host 2, is stored in the buffer memory 24, and then the data stored in the buffer memory 24 is written in the magnetic disk 101. In addition, data read from the magnetic disk 101, is stored in the buffer memory 24, and then the data stored in the buffer memory 24 is output to the host 2.

The buffer memory 24, for example, is configured of a memory capable of performing a high-speed operation. The kind of memory configuring the buffer memory 24, is not limited to a specific kind. The buffer memory 24, for example, may be configured of a dynamic random access memory (DRAM) or a static random access memory (SRAM).

The HDC 25 is connected to the host 2 through a certain interface, and executes communication with the host 2. A standard which the interface conforms to is not limited to a specific standard. The HDC 25 stores data received from the RDCs 22a and 22b, in the buffer memory 24. Then, the HDC 25 transmits the data from the RDCs 22a and 22b, which is stored in the buffer memory 24, to the host 2.

In addition, the HDC 25 stores, in the buffer memory 24, the data received along with the write command from the host 2. That is, the buffer memory 24 receives the data from the host 2. The HDC 25 outputs the data from the host 2, which is stored in the buffer memory 24, to the RDCs 22a and 22b.

The MPU 26 is a processor executing firmware (a firmware program). The MPU 26 analyzes a command from the host 2, which is received by the HDC 25, monitors the status of the magnetic disk device 1, and controls each unit included in the magnetic disk device 1.

The memory 27 functions as a region or the like, in which firmware and various management information items are stored. The memory 27 is configured of a volatile memory, a non-volatile memory, or a combination of the volatile memory and the non-volatile memory. The volatile memory, for example, may be an SRAM, a DRAM, and the like. The non-volatile memory may be a flash memory and the like.

As described above, the pair of magnetic heads 102a, and the pair of magnetic heads 102b, are respectively attached to different actuators 104. The actuators 104 are respectively driven by different VCMs 105. In addition, the preamplifier 21 and the RDC 22 are provided in each of the actuators 104.

Accordingly, the control circuit 20 is capable of independently executing access to the magnetic disk 101a using the first actuator 104a, and access to the magnetic disk 101b using the second actuator 104b.

The control circuit 20 executes the access to the magnetic disk 101a using the first actuator 104a, and the access to the magnetic disk 101b using the second actuator 104b, in parallel. Accordingly, an access rate to the magnetic disk 101 is improved, compared to a case where the access to the magnetic disk 101 is performed by driving only one actuator 104.

In order to execute the access to the magnetic disk 101a using the first actuator 104a, and the access to the magnetic disk 101b using the second actuator 104b, in parallel, it is necessary to distribute data received from the host 2 in serial, into the first actuator 104a and the second actuator 104b.

Figure 4:
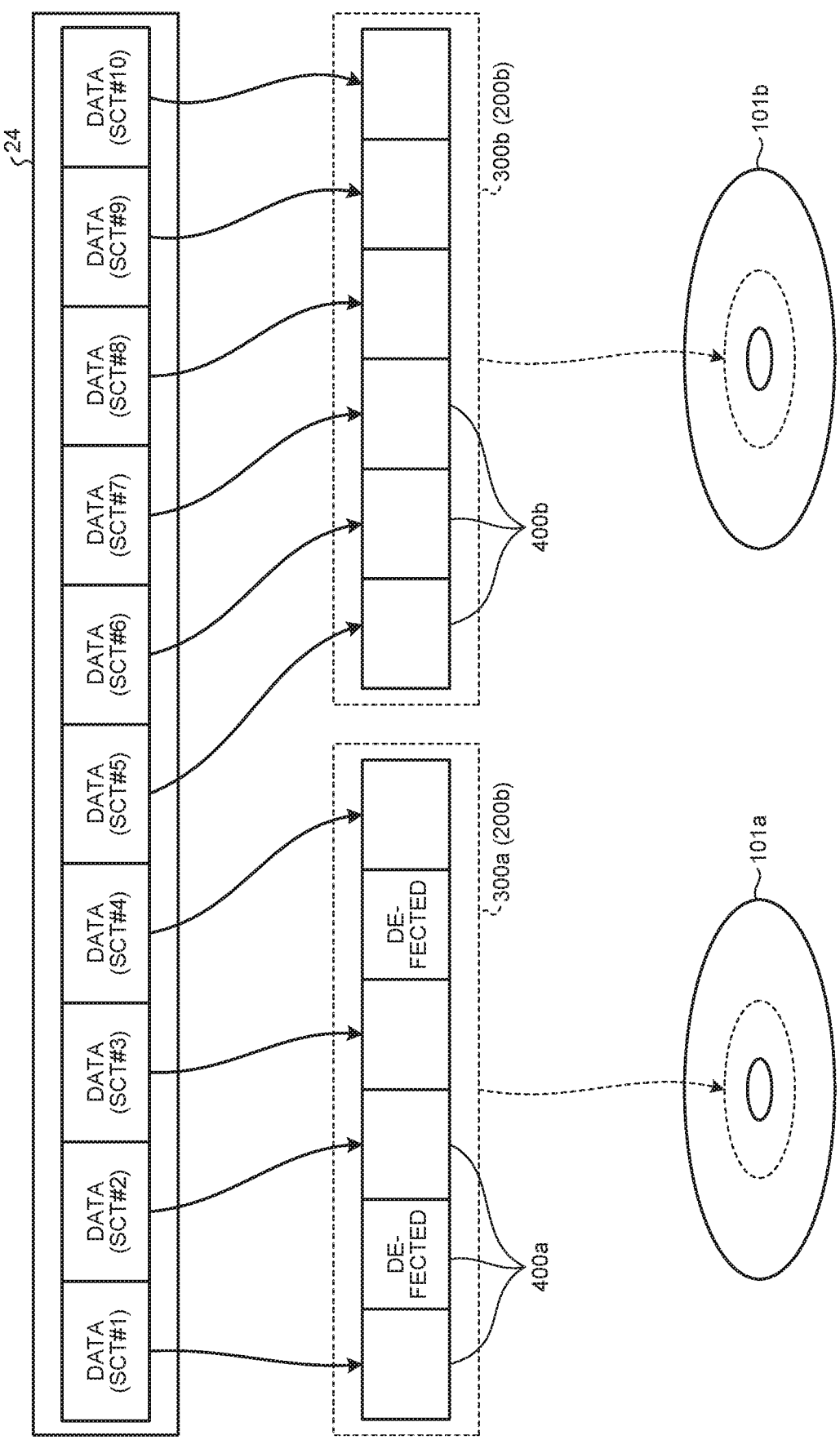
FIG. 4 is a diagram for describing the outline of a data distributing method of a control circuit of the embodiment.

FIG. 4 is a diagram for describing the outline a data distributing method of the control circuit 20 of the embodiment.

Here, a case where the control circuit 20 receives data from the host 2 in an access pattern of sequential write, will be described. The sequential write is an access pattern of writing data in an order of logical addresses. A logical address is location information indicating a location in a logical address space that is provided to the host 2 by the magnetic disk device 1. A logical address can also be referred to as a logical block address (LBA).

Further, herein, each data item of sector unit, is discriminated by using a sector number. Herein, the sector number is not location information applied to a sector on the magnetic disk 101, but is location information indicating a location in a range of a sector size in the logical address space. That is, the sector number is a kind of a logical address.

According to an example illustrated in FIG. 4, data is stored in consecutive sectors of a sector #1 to a sector #10 in the buffer memory 24. That is, data of 10 sectors is stored in the buffer memory 24.

The control circuit 20 distributes the data stored in the buffer memory 24, into the first actuator 104a and the second actuator 104b in track units.

Specifically, the control circuit 20 writes a track of data items having consecutive sector numbers, in the magnetic disk 101a by using the first actuator 104a. Then the control circuit 20 writes a track of data items having following consecutive sector numbers, in the magnetic disk 101b by using the second actuator 104b.

There is a case where a track includes one or more of defective sectors. A defective sector is referred to as a sector which it is not possible to perform reading data from or it is difficult to perform reading data from. The number of defective sectors included in each of the tracks, is not constant. Therefore, the number of accessible sectors of each of the tracks, varies depending on the number of defective sectors.

The control circuit 20 calculates a size (the number of sectors) of writable data in each of the tracks, on the basis of the number of defective sectors. Then, the control circuit 20 determines a writing destination of each of the data items of sector unit, stored in the buffer memory 24, on the basis of the calculated size.

According to the example of FIG. 4, the control circuit 20 (for example, the MPU 26) calculates the number of sectors capable of storing data, with respect to each of a track 300a in the magnetic disk 101a and a track 300b in the magnetic disk 101b.

Then, the control circuit 20 specifies that two of six sectors correspond to defective sectors in the track 300a, and thus, specifies that the number of sectors capable of storing data in the track 300a, is 4. The control circuit 20 specifies that there is no defective sector in the track 300b, and thus, specifies that the number of sectors capable of storing data in the track 300b, is 6.

Then, the control circuit 20 determined the writing destination of four data items (the data items of the sectors #1 to #4) having consecutive sector numbers, in the data stored in the buffer memory 24, as the track 300a. Then, the control circuit 20 determines the writing destination of six data items (data items of sectors #5 to #10) having sector numbers subsequent to the data written in the track of the magnetic disk 101a, as the track 300b.

The writing to the track 300a, is executed by using the first actuator 104a. The writing to the track 300b, is executed by using the second actuator 104b. That is, in the embodiment, each of the data items received from the host 2, is distributed into the first actuator 104a and the second actuator 104b, in track units.

A technology of distributing each of the data items received from the host 2 with respect to a plurality of actuators in sector units, is considered as a technology compared to the embodiment. The technology will be referred to as a comparative example.

According to the comparative example, for example, data of which a sector number is an odd number, is distributed into the first actuator 104a, and data of which a sector number is an even number, is distributed into the second actuator 104b.

Here, the number of sectors capable of storing data in the track 300a, is 4, and thus, in a case where the data of the sectors #1, #3, #5, #7, and #9 among the data of the sectors #1 to #10, is to be written in the magnetic disk 101a, the data of the sectors #1, #3, #5, and #7 is written in the track 300a, and the data of the sector #9 should be written in a track different from the track 300a in the magnetic disk 101a. In contrast, the number of sectors capable of storing data in the track 300b, is 6, and thus, all of the data items of which the sector number is an even number, in the data of the sectors #1 to #10, are written in the track 300b.

That is, according to the comparative example, the data of the sectors #1 to #10, is written in two tracks in the magnetic disk 101a, and one track in the magnetic disk 101b. Therefore, it is necessary to perform access for two tracks to the magnetic disk 101a, and an extra seek time is required, at the time of writing or reading the data of the sectors #1 to #10. That is, according to the comparative example, the performance of the magnetic disk device deteriorates.

In contrast, according to the embodiment, the writing or reading is performed only with respect to the track 300a of the magnetic disk 101a, and the track 300b of the magnetic disk 101b. According to the embodiment, it is possible to suppress the number of tracks to be written or read, of each of the actuators 104, compared to the comparative example. Therefore, according to the embodiment, it is possible to improve the performance of the magnetic disk device 1, compared to the comparative example.

Furthermore, according to the comparative example, it is necessary to store not only the track 300a but also a track in which the data of the sector #9 is stored, with respect to the magnetic disk 101a, as the writing destination of the data of the sectors #1 to #10.

In contrast, according to the embodiment, it is sufficient to store only the track 300a with respect to the magnetic disk 101a, as the writing destination of the data of the sectors #1 to #10. Hence, according to the embodiment, it is easy to manage a storage destination of data, compared to the comparative example.

It should be noted that a specifying method of the defective sector, is not limited to a specific method.

In the embodiment, a location of the defective sector detected by an inspection prior to shipment, or a location of the defective sector that is generated and detected during the operation, is recorded in defective sector information 271, as an example. A detecting method of the defective sector is not limited to a specific method. The defective sector information 271, for example, is stored in the memory 27. The control circuit 20 specifies whether or not each sector included in a target track is the defective sector, with reference to the defective sector information 271. Then, the control circuit 20 calculates the number of sectors capable of storing data, included in the target track, on the basis of a specifying result.

Next, the operation of the magnetic disk device 1 of the embodiment will be described.

Figure 5:
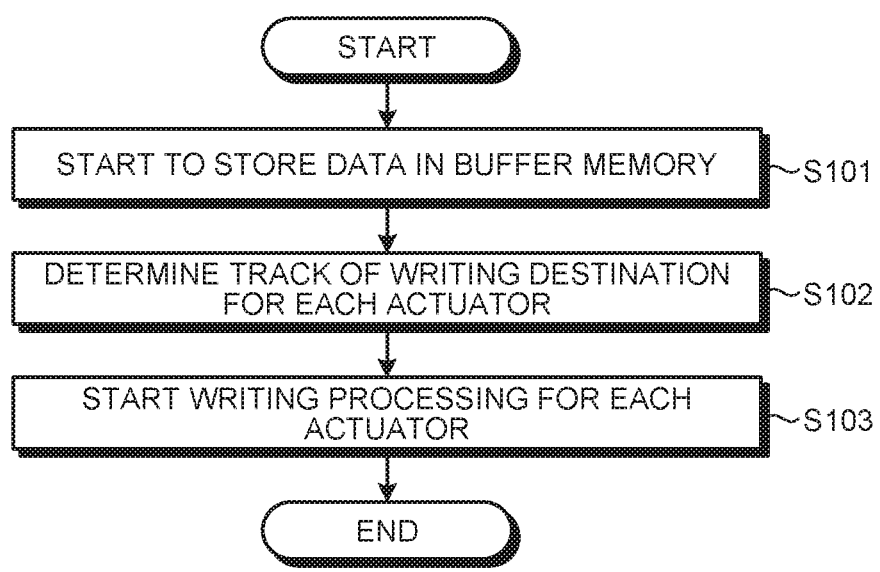
FIG. 5 is a flowchart for describing an operation of the magnetic disk device of the embodiment, according to a write command.

FIG. 5 is a flowchart for describing the operation of the magnetic disk device 1 of the embodiment, according to the write command.

The control circuit 20 (for example, the HDC 25) starts to receive the data that is requested to be written from the host 2, and starts to store the received data in the buffer memory 24 (S101). The control circuit 20 (for example, the MPU 26) determines the track of the writing destination for each of the actuators 104 (S102).

Figure 6:
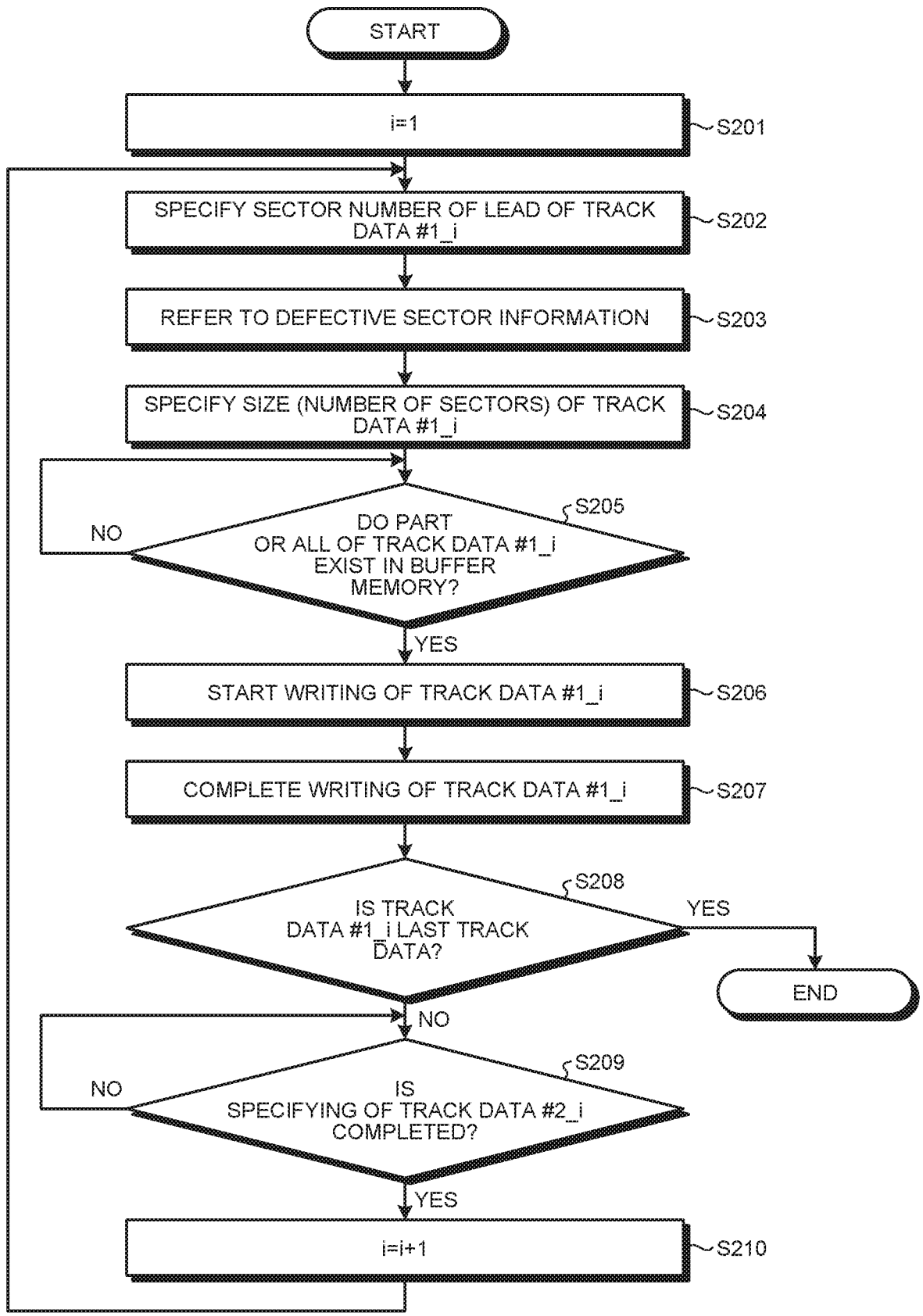
FIG. 6 is a flowchart for describing writing processing using a first actuator of the embodiment.
Figure 7:
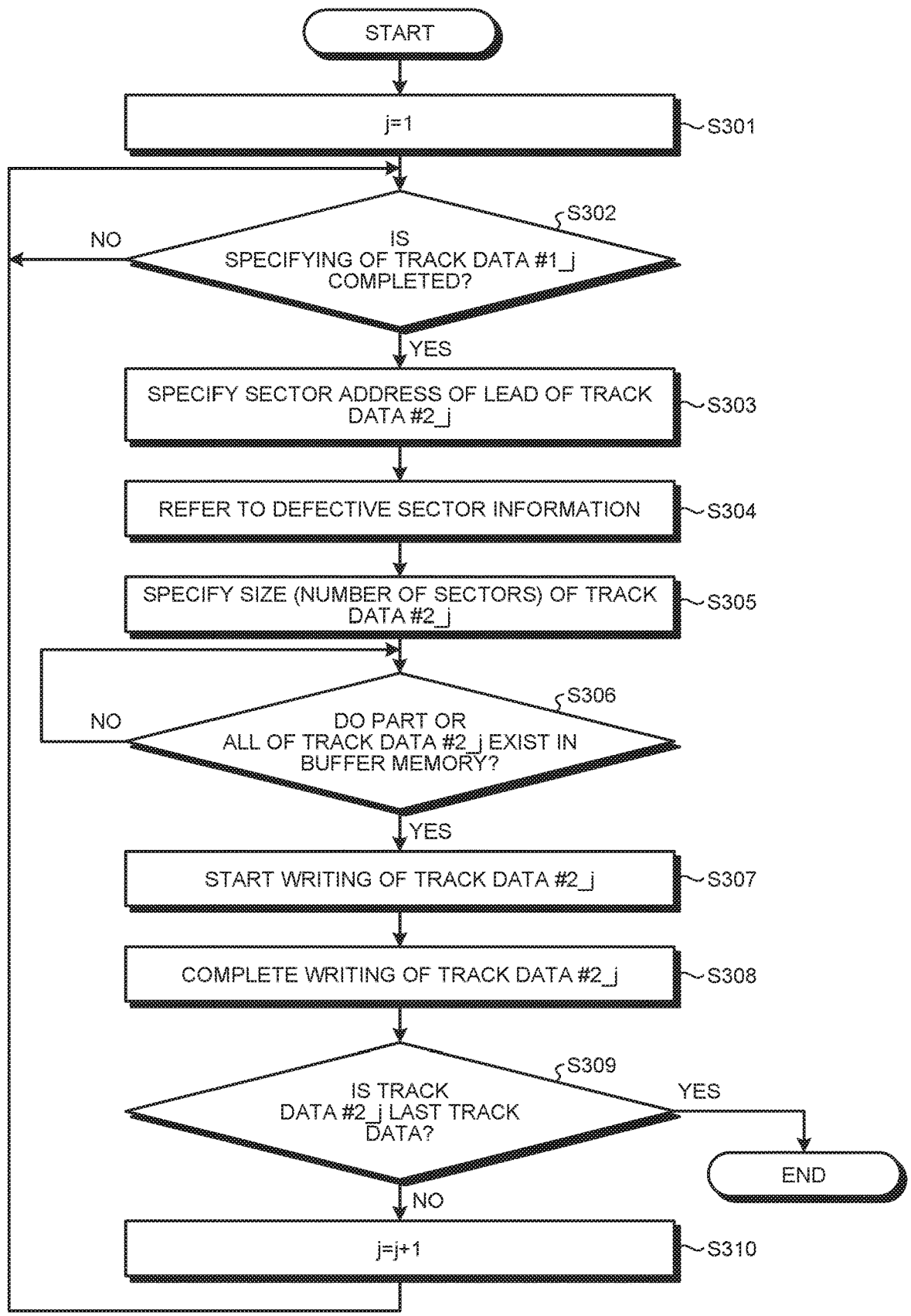
FIG. 7 is a flowchart for describing writing processing using a second actuator according to the embodiment.

In the description of FIG. 5 to FIG. 7, the track of the writing destination in which writing is executed by using the first actuator 104a, will be referred to as a track #1_x. In addition, the track of the writing destination in which writing is executed by using the second actuator 104b, will be referred to as a track #2_x. It should be noted that "x" is an integer of greater than 1, and corresponds to a writing order.

For example, regarding the first actuator 104a, the writing of data is executed with respect to a track #1_1, a track #1_2, and a track #1_3 in the magnetic disk 101a, in this order. In addition, regarding the second actuator 104b, the writing of data is executed with respect to a track #2_1, a track #2_2, and a track #2_3 in the magnetic disk 101b, in this order.

In addition, here, the writing for the first time is executed by using the first actuator 104a, as an example. The writing for the first time may be executed by using the second actuator 104b.

In addition, data of track unit to be written in the track #1_x, will be referred to as track data #1_x. In addition, data of track unit to be written in the track #2_x, will be referred to as track data #2_x.

Subsequent to S102, the control circuit 20 starts writing processing for each of the actuators 104 (S103). In a case where the writing processing for each of the actuators 104 is completed, the operation according to the write command, is completed.

FIG. 6 is a flowchart for describing writing processing using the first actuator 104a of the embodiment.

First, the control circuit 20 (for example, the MPU 26) initializes i that is a loop counter for the subsequent loop processing, to 1 (S201). Then, the control circuit 20 (for example, the MPU 26) specifies a sector number of the lead of track data #1_i to be written in a track #1_i (S202).

Subsequently, the control circuit 20 (for example, the MPU 26) refers to the defective sector information 271 (S203). In S203, the control circuit 20 specifies the number of defective sectors included in the track #1_i.

Subsequently, the control circuit 20 (for example, the MPU 26) specifies the size of the track data #1_i (S204). For example, the control circuit 20 subtracts the number of defective sectors that is specified in S203, from the number of sectors included in the track #1_i, and thus, calculates the number of writable sectors in the track #1_i. Then, the control circuit 20 specifies the calculated number of writable sectors in the track #1_i, as the size of the track data #1_i.

In S202, the sector number of the lead of the track data #1_i is specified, and in S204, the size of the track data #1_i is specified. Accordingly, in data requested to be written by the write command, the data to be written in the track #1_i, that is, the track data #1_i is specified.

It is not limited that the track data #1_i is stored in the buffer memory 24 at a timing when S204 is ended. Therefore, the control circuit 20 (for example, the MPU 26) determines whether or not a part or all of the track data #1_i exist in the buffer memory 24 (S205).

For example, in a case where the data of the sector number of the lead of the track data #1_i, is stored in the buffer memory 24, the control circuit 20 may determine that a part or all of the track data #1_i exist in the buffer memory 24. In a case where the data of the sector number of the lead of the track data #1_i, is not stored in the buffer memory 24, the control circuit 20 may not determine that a part or all of the track data #1_i exist in the buffer memory 24.

Furthermore, a method of determining whether or not a part or all of the track data #1_i exist in the buffer memory 24, is not limited to the method described above. The control circuit 20 is capable of determining whether or not a part or all of the track data #1_i exist in the buffer memory 24, on the basis of an arbitrary determination standard.

In a case where it is not determined that a part or all of the track data #1_i exist in the buffer memory 24 (S205, No), the processing of S205 is executed again. Accordingly, the start of the processing of S206 is delayed until it is determined that a part or all of the track data #1_i exist in the buffer memory 24.

In a case where it is determined that a part or all of the track data #1_i exist in the buffer memory 24 (S205, Yes), the control circuit 20 starts the writing of the track data #1_i (S206). That is, the control circuit 20 writes the track data #1_i stored in the buffer memory 24, in the track #1_i, in the order from the data of the sector number of the lead.

Here, a writing rate of the data to the magnetic disk 101 of one actuator 104, is slower than a transmitting rate of the data to the magnetic disk device 1 from the host 2. Therefore, even in a case where the control circuit 20 starts to write the data at the time of storing a part of the track data #1_i in the buffer memory 24, the remaining data of the track data #1_i is stored in the buffer memory 24 at a rate faster than the writing rate to the magnetic disk 101. Accordingly, the control circuit 20 is capable of successively writing the data items included in the track data #1_i into the magnetic disk 101.

In a case where the writing of the track data #1_i is completed (S207), the control circuit 20 (for example, the MPU 26) determines whether or not the track data #1_i is the last track data (S208).

That is, in S208, the control circuit 20 determines whether or not the track data #1_i is the last track data distributed into the first actuator 104a, in the data requested to be written according to the write command.

In a case where it is determined that the track data #1_i is the last track data (S208, Yes), the writing processing using the first actuator 104a is completed.

In a case where it is determined that the track data #1_i is not the last track data (S208, No), the control circuit 20 (for example, the MPU 26) determines whether or not the specifying of track data #2_i is completed (S209). The specifying of the track data #2_i is specifying a sector number of data of the lead of the track data #2_i and the size of the track data #2_i, and specifically correspond to processing of S303 to S305 in the case of j=i, in a series of processing illustrated in FIG. 7.

The track data #2_i is data received from the host 2, subsequent to the track data #1_i. The sector number of the data of the lead of the track data #2_i, is subsequent to a sector number of data of the tail of the track data #1_i. In a case where the size of the track data #2_i can be specified, it is possible to specify a sector number of data of the lead of track data #1 (i+1), or the like, received from the host 2, subsequent to the track data #2_i.

In a case where it is determined that the specifying of the track data #2_i is not completed (S209, No), the control circuit 20 repeats the processing of S209. Accordingly, the control circuit 20 delays the start of the next processing (S210) until the specifying of the track data #2_i is completed.

In a case where it is determined that the specifying of the track data #2_i is completed (S209, Yes), the control circuit 20 (for example, the MPU 26) increases the value of i by 1 (S210), and executes again the processing of S202. In S202, the control circuit 20, for example, adds the size of the track data #2 (i−1) to the sector number of the data of the lead of the track data #2 (i−1), and thus, is capable of obtaining the sector number of the data of the lead of the track data #1_i.

FIG. 7 is a flowchart for describing writing processing using the second actuator 104b of the embodiment.

First, the control circuit 20 (for example, the MPU 26) initializes j that is a loop counter for the subsequent loop processing, to 1 (S301). Then, the control circuit 20 (for example, the MPU 26) determines whether or not the specifying of track data #1_j is completed (S302). The specifying of the track data #1_j, is specifying a sector number of data of the lead of the track data #1_j and the size of the track data #1_j, and specifically, correspond to the processing of S202 to S204 in the case of i=j, in a set of processing illustrated in FIG. 6.

Track data #2_j that is track data to be written in a track #2_j is received from the host 2, subsequent to the track data #1_j. A sector number of data of the lead of the track data #2_j, is subsequent to a sector number of data of the tail of the track data #1_j. Accordingly, in a case where the size of the track data #1_j can be specified, it is possible to specify a sector number of the data of the lead of the track data #2_j, or the like, received from the host 2, subsequent to the track data #1_j.

In a case where it is determined that the specifying of the track data #1_j is not completed (S302, No), the control circuit 20 repeats the processing of S302. Accordingly, the control circuit 20 delays the start of the next processing (S303) until the specifying of the track data #1_j is completed.

In a case where it is determined that the specifying of the track data #1_j is completed (S302, Yes), the control circuit 20 (for example, the MPU 26) specifies the sector number of the lead of the track data #2_j (S303).

Subsequently, the control circuit 20 (for example, the MPU 26) refers to the defective sector information 271 (S304). In S304, the control circuit 20 specifies the number of defective sectors included in the track #2_j.

Subsequently, the control circuit 20 (for example, the MPU 26) specifies the size of the track data #2_j (S305). For example, the control circuit 20 subtracts the number of defective sectors specified in S304, from the number of sectors included in the track #2_j, and thus, calculates the number of writable sectors in the track #2_j. Then, the control circuit 20 specifies the calculated number of writable sectors in the track #2_j, as the size of the track data #2_j.

Subsequently, the control circuit 20 (for example, the MPU 26) determines whether or not a part or all of the track data #2_j exist in the buffer memory 24 (S306). A determining method of S306 is not limited to a specific method. In S306, the determination can be executed by the same method as the method in S205.

In a case where it is not determined that a part or all of the track data #2_j exist in the buffer memory 24 (S306, No), the processing of S306 is executed again. Accordingly, the start of the processing of S307 is delayed until it is determined that a part or all of the track data #2_j exist in the buffer memory 24.

In a case where it is determined that a part or all of the track data #2_j exist in the buffer memory 24 (S306, Yes), the control circuit 20 starts the writing of the track data #2_j (S307). That is, the control circuit 20 writes the track data #2_j stored in the buffer memory 24, into the track #2_j, in the order from the data of the sector number of the lead. Even in a case where the control circuit 20 starts the writing of the data when only a part of the track data #2_j is stored in the buffer memory 24, the remaining data of the track data #2_j is stored in the buffer memory 24 at a rate faster than the writing rate to the magnetic disk 101. Accordingly, the control circuit 20 is capable of successively writing the data items of each of the sector numbers included in the track data #2_j, in the magnetic disk 101.

In a case where the writing of the track data #2_j is completed (S308), the control circuit 20 (for example, the MPU 26) determines whether or not the track data #2_j is the last track data (S309).

That is, in S309, the control circuit 20 determines whether or not the track data #2_j is the last track data to be written by using the second actuator 104b, in the data requested to be written according to the write command.

In a case where it is determined that the track data #2_j is the last track data (S309, Yes), there is no track data to be written by the second actuator 104b, and thus, the writing processing using the second actuator 104b is completed.

In a case where it is determined that the track data #2_j is not the last track data (S309, No), the control circuit 20 (for example, the MPU 26) increases the value of j by 1 (S310), and executes again the processing of S302.

Figure 8:
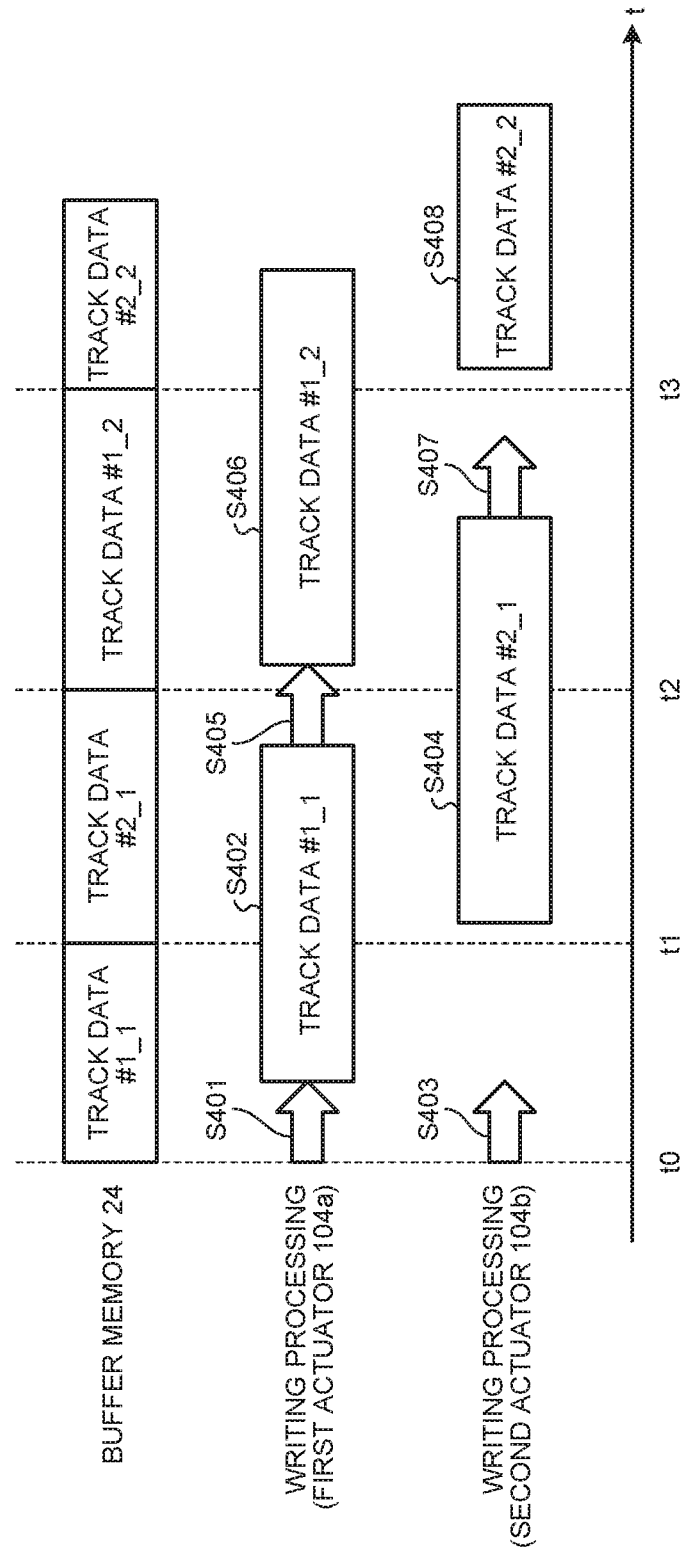
FIG. 8 is a diagram for describing a timing when each track data item of the embodiment is written.

FIG. 8 is a diagram for describing a timing when each of the track data items of the embodiment is written.

In the first row from the top of this drawing, a timing when the data of the writing target is stored in the buffer memory 24, is represented. According to the first row, writing of track data #1_1 is started at a time t0, and the writing of the track data #1_1 is completed at a time t1. Similarly, writing of track data #2_1 is started at the time t1, and is completed at a time t2. Similarly, writing of track data #1_2 is started at the time t2, and is completed at a time t3. Similarly, writing of track data #2_2 is started at the time t3, and is completed at a time t4.

In the second row from the top of this drawing, the progress of the writing processing using the first actuator 104a, is represented. In the third row from the top of this drawing, the progress of the writing processing using the second actuator 104b, is represented.

At the time t0, the control circuit 20 executes preparing the transmission of the track data #1_1 (S401). The processing of S401 or processing of S405 described below, corresponds to the processing of S202 to S204.

At a timing when the preparation of the transmission of the track data #1_1 (S401) is completed, a part of the track data #1_1 is stored in the buffer memory 24, and thus, the control circuit 20 executes the writing of the track data #1_1, immediately after S401 (S402).

The control circuit 20 further executes the preparation of the transmission of the track data #2_1 at the time t0 (S403). The processing of S403 or processing of S407 described below, corresponds to the processing of S303 to S305. According to the processing of S401, the track data #1_1 is specified, and thus, the control circuit 20 is capable of specifying the track data #2_1 in S403.

At a timing when the processing of S403 is completed, the writing of the track data #2_1 to the buffer memory 24, is not started. The control circuit 20 starts the writing of the track data #2_1, at a timing after a part of the track data #2_1 is stored in the buffer memory 24, that is, a timing slightly after the time t1 (S404).

At a timing when the writing of the track data #1_1 (S402) is completed, the specifying of the track data #2_1 (S403) is completed. Accordingly, the control circuit 20 executes the preparation of the transmission of the track data #1_2 (S405). That is, the control circuit 20 specifies the track data #1_2.

At a timing when the preparation of the transmission of the track data #1_2 (S405) is completed, a part of the track data #1_2 are stored in the buffer memory 24, and thus, the control circuit 20 starts the writing of the track data #1_2, immediately after S405 (S406).

At a timing when the writing of the track data #2_1 (S404) is completed, the specifying of the track data #1_2 (S405) is completed. Accordingly, the control circuit 20 executes the preparation of the transmission of the track data #2_2 (S407). That is, the control circuit 20 specifies the track data #2_2.

At a timing when the processing of S407 is completed, the writing of the track data #2_2 to the buffer memory 24, is not started. The control circuit 20 starts the writing of the track data #2_2 at a timing after a part of the track data #2_2 is stored in the buffer memory 24, that is, a timing slightly after the time t3 (S408).

In a case where the processing of S406 and S408 are completed, the writing of all of the data items stored in the buffer memory 24 to the magnetic disk 101 is ended.

Thus, distributing of the data received from the host 2 is realized in track units.

Figure 9:
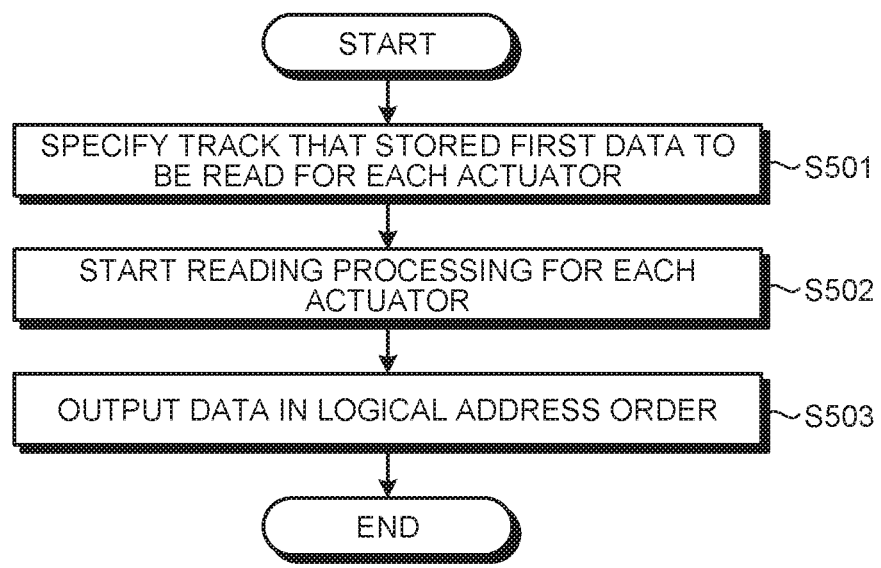
FIG. 9 is a flowchart for describing an operation of the magnetic disk device of the embodiment, according to a read command.

FIG. 9 is a flowchart for describing the operation of the magnetic disk device 1 of the embodiment, according to the read command.

The control circuit 20 (for example, the MPU 26), first, specifies a track that stored the first data to be read for each of the actuators 104 (S501). After that, the control circuit 20 starts reading processing for each of the actuators 104 (S502).

Figure 10:
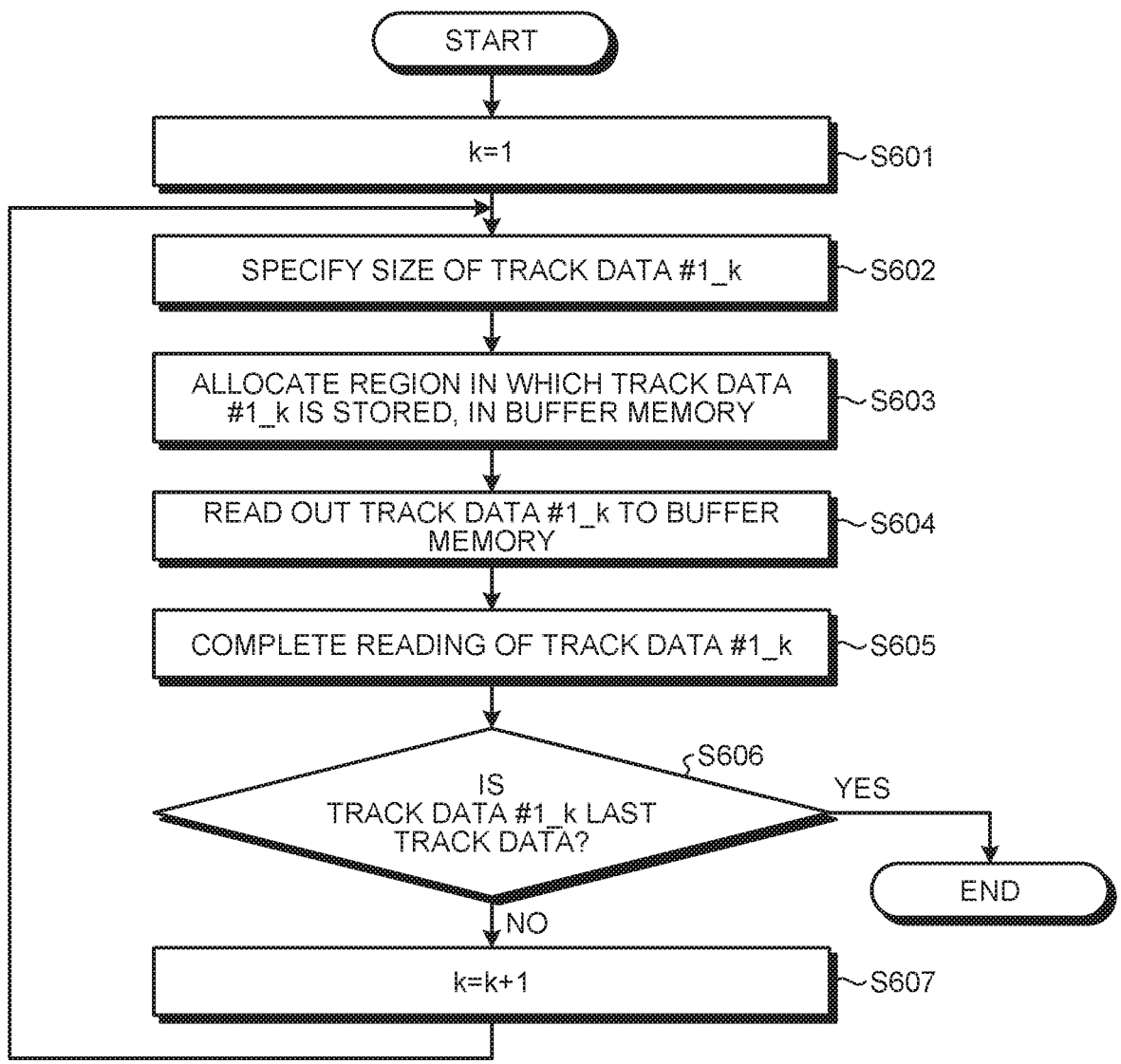
FIG. 10 is a flowchart for describing reading processing using the first actuator of the embodiment.
Figure 11:
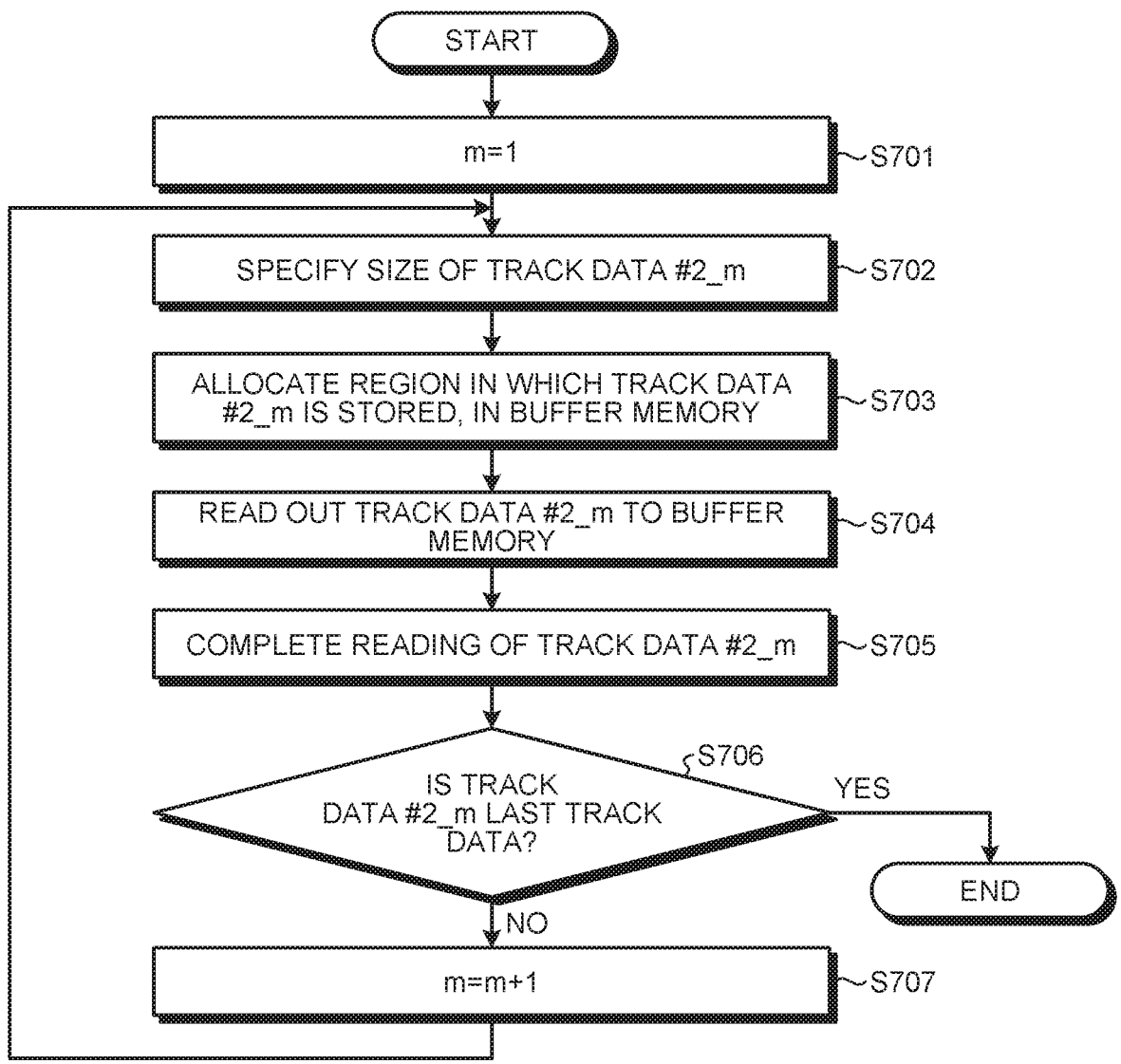
FIG. 11 is a flowchart for describing reading processing using the second actuator of the embodiment.

In the description of FIG. 9 to FIG. 11, a case where the track data items #1_x and #2_x described in FIGS. 5 to 7, are a reading target, will be described.

A method of determining the track that stored the first data to be read is not limited to a specific method. In an example, the control circuit 20 stores a correspondence between the logical address and each of the sectors in the magnetic disk 101. Then, in general, the data of the reading target is designated in the range of the logical address, according to the read command. The control circuit 20 specifies the track that stored the first data to be read, on the basis of the correspondence between the logical address and each of the sectors in the magnetic disk 101, and the range of the logical address, designated by the read command.

According to the reading processing for each of the actuators 104, the data of the reading target is sequentially stored in the buffer memory 24. The HDC 25 transmits the data stored in the buffer memory 24, to the host 2, in the logical address (sector number) order (S503). In a case where the transmission of all of the data items is completed, the operation according to the read command, is ended.

FIG. 10 is a flowchart for describing reading processing using the first actuator 104a of the embodiment.

First, the control circuit 20 (for example, the MPU 26) initializes k that is a loop counter for the subsequent loop processing, to 1 (S601). Then, the control circuit 20 (for example, the MPU 26) specifies the size of track data #1_k (S602). The size of the track data #1_k can be specified by counting the number of sectors associated with the logical address, included in a track #1_k. Furthermore, a specifying method of the size of the track data #1_k is not limited thereto.

Subsequently, the control circuit 20 (for example, the MPU 26) allocates a region in which the track data #1_k is stored, in the buffer memory 24 (S603). In S603, the control circuit 20 allocates a region having the size obtained in S602.

Subsequently, the control circuit 20 (for example, the HDC 25) reads out the track data #1_k from the track #1_k to the buffer memory 24 (S604). In S604, the track data #1_k is stored in the region in the buffer memory 24, allocated in S603.

In a case where the reading of the track data #1_k is completed (S605), the control circuit 20 (for example, the MPU 26) determines whether or not the track data #1_k is the last track data (S606).

That is, in S606, the control circuit 20 determines whether or not the track data #1_k is the last track data to be read by using the first actuator 104a, in the data requested to be read according to the read command.

In a case where it is determined that the track data #1_k is the last track data (S606, Yes), the reading processing using the first actuator 104a is completed.

In a case where it is determined that the track data #1_k is not the last track data (S606, No), the control circuit 20 (for example, the MPU 26) increases the value of k by 1 (S607), and executes again the processing of S602.

FIG. 11 is a flowchart for describing reading processing using the second actuator 104b of the embodiment.

First, the control circuit 20 (for example, the MPU 26) initializes m that is a loop counter for the subsequent loop processing, to 1 (S701). Then, the control circuit 20 (for example, the MPU 26) specifies the size of track data #2_m (S702). The size of the track data #2_m can be specified by counting the number of sectors associated with the logical address included in a track #2_m. A method of specifying the size of the track data #2_m is not limited thereto.

Subsequently, the control circuit 20 (for example, the MPU 26) allocates a region in which the track data #2_m is stored, in the buffer memory 24 (S703). In S703, the control circuit 20 (for example, the MPU 26) allocates a region having the size obtained in S702.

Subsequently, the control circuit 20 (for example, the HDC 25) reads out the track data #2_m from the track #2_m to the buffer memory 24 (S704). In S704, the track data #2_m is stored in the region in the buffer memory 24, allocated in S703.

In a case where the reading of the track data #2_m is completed (S705), the control circuit 20 (for example, the MPU 26) determines whether or not the track data #2_m is the last track data (S706).

That is, in S706, the control circuit 20 determines whether or not the track data #2_m is the last track data to be read by using the second actuator 104*b*, in the data requested to be read according to the read command.

In a case where it is determined that the track data #2_m is the last track data (S706, Yes), the reading processing using the second actuator 104*b* is completed.

In a case where it is determined that the track data #2_m is not the last track data (S706, No), the control circuit 20 (for example, the MPU 26) increases the value of m by 1 (S707), and executes again the processing of S702.

Figure 12:
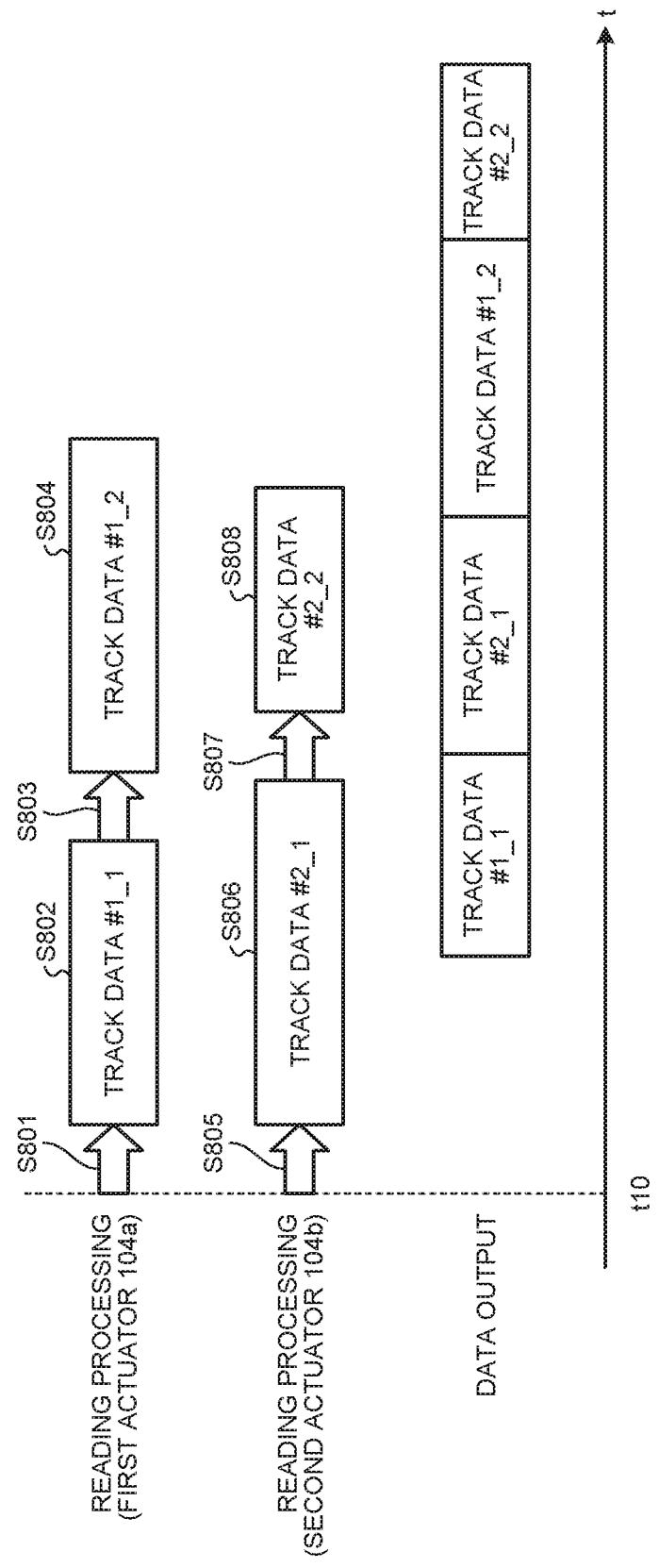
FIG. 12 is a diagram for describing a timing when each track data item of the embodiment is read.

FIG. 12 is a diagram for describing a timing when each of the track data items of the embodiment is read.

In the first row from the top of this drawing, the progress of the reading processing using the first actuator 104*a*, is represented. In the second row from the top of this drawing, the progress of the reading processing using the second actuator 104*b*, is represented. In the third row from the top of this drawing, a timing when each data item is transmitted from the buffer memory 24 to the host 2, is represented.

First, at a time t10, the control circuit 20 executes the preparation of the transmission of the track data #1_1 (S801). The processing of S801 or processing S803 described below, corresponds to the processing of S602 and S603.

In a case where the preparation of the transmission of the track data #1_1 (S801) is completed, the control circuit 20 immediately executes the reading of the track data #1_1 (S802).

In a case where the processing of S802 is completed, the control circuit 20 executes the preparation of the transmission of the track data #1_2 (S803). After that, the control circuit 20 immediately executes the reading of the track data #1_2 (S804).

Regarding the second actuator 104*b*, the control circuit 20 executes the preparation of the transmission of the track data #2_1, at the time t10 (S805). The processing of S805 or processing of S807 described below, corresponds to the processing of S702 and S703.

In a case where the preparation of the transmission of the track data #2_1 (S805) is completed, the control circuit 20 immediately executes the reading of the track data #2_1 (S806).

In a case where the processing of S806 is completed, the control circuit 20 executes the preparation of the transmission of the track data #2_2 (S807). After that, the control circuit 20 immediately executes the reading of the track data #2_2 (S808).

Each of the track data items stored in the buffer memory 24, is transmitted to the host 2, in the logical address order. In this example, the track data #1_1, the track data #2_1, the track data #1_2, and the track data #2_2 are transmitted to the host 2, in this order.

Thus, the reading processing for each of the actuators 104 can be completely independently executed, at the time of processing the read command.

Furthermore, in the above description, a region allocating method in the buffer memory 24 has not been mentioned. The region allocating method in the buffer memory 24, is not limited to a specific method.

Figure 13:
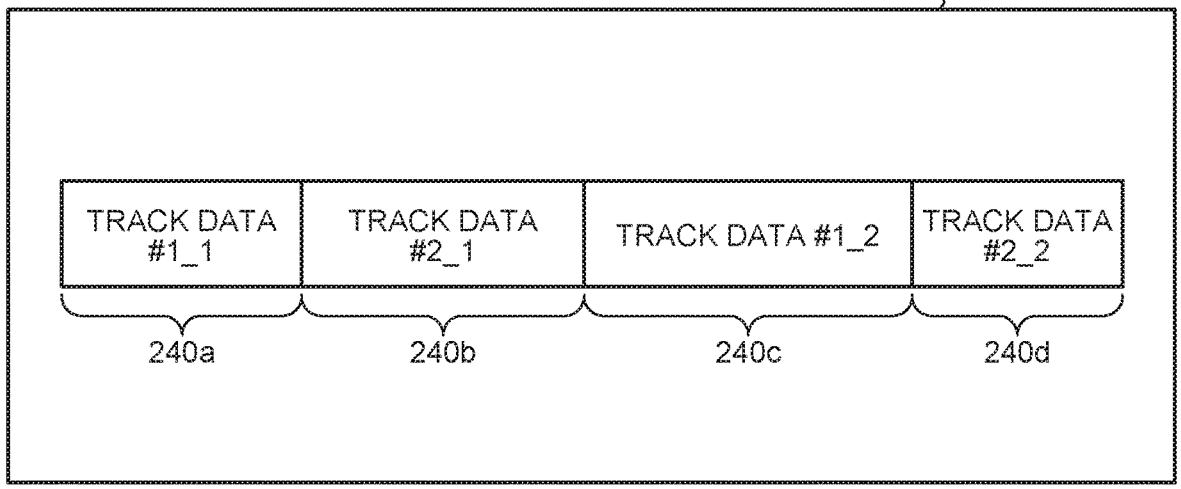
FIG. 13 is a diagram for describing an example of a region allocating method in a buffer memory of the embodiment.

FIG. 13 is a diagram for describing an example of the region allocating method in the buffer memory 24 of the embodiment. As illustrated in this drawing, a region 240*a* for the track data #1_1, a region 240*b* for the track data #2_1, a region 240*c* for the track data #1_2, and a region 240*d* for the track data #2_2, are allocated in the buffer memory 24 to be consecutive in this order. According to such an example, in a case where the HDC 25 consecutively reads the data in the buffer memory 24 from the lead of the region 240*a* to the tail of the region 240*d*, the output in the logical address order can be realized.

Figure 14:
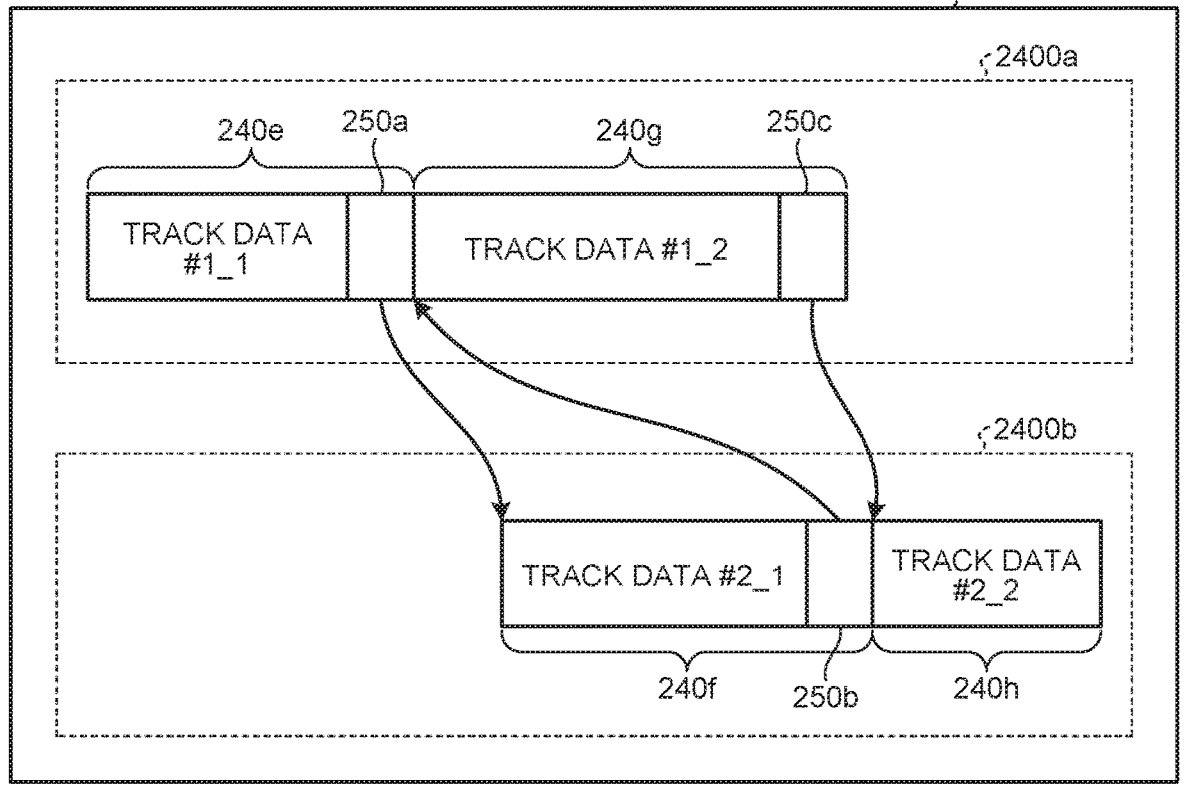
FIG. 14 is a diagram for describing another example of the region allocating method in the buffer memory of the embodiment.

FIG. 14 is a diagram for describing another example of the region allocating method in the buffer memory 24 of the embodiment. In the example of this drawing, a region 2400*a* for the first actuator 104*a* and a region 2400*b* for the second actuator 104*b* are allocated in advance in the buffer memory 24. In the reading processing using the first actuator 104*a*, the region 2400*a* is used, and in the reading processing using the second actuator 104*b*, the region 2400*b* is used.

In this case, for example, the control circuit 20 (for example, the MPU 26) stores a pointer indicating where track data having the subsequent logical address is stored, for example, in the tail of each of the regions. For example, the control circuit 20 stores a pointer 250*a* indicating the location of the lead of a region 240*f*, in the tail of a region 240*e* for the track data #1_1, at the time of allocating the region 240*f* for the track data #2_1. The control circuit 20 stores a pointer 250*b* indicating the location of the lead of a region 240*g* in the tail of a region 240*f* for the track data #2_i, at the time of allocating the region 240*g* for the track data #1_2. The control circuit 20 stores a pointer 250*c* indicating the location of the lead of a region 240*h* in the tail of the region 240*g* for the track data #1_2, at the time of allocating the region 240*h* for the track data #2_2.

In a case where the transmission of one track data item to the host 2 is completed, the HDC 25 allows a pointer that indicates an address of buffer memory 24 to jump to a location indicated by a pointer stored in a location subsequent to the track data in the buffer memory 24. Accordingly, the output in the order of logical addresses can be realized.

In the above description, a case where the magnetic disk device 1 includes two actuators 104 that can be each independently controlled, has been described. The technology of the embodiment can also be applied to a case where the magnetic disk device 1 includes three or more actuators 104 that can be each independently controlled. A case where the magnetic disk device 1 includes three or more actuators 104 that can be each independently controlled, the control circuit 20, for example, distributes the data received in serial from the host 2, into three or more actuators in track units. A distributing rule, for example, may be a round-robin method, or may not be a round-robin method.

In addition, a relationship between the plurality of actuators 104 and the plurality of magnetic heads 102, is not limited only to the relationship described above. The relationship between the plurality of actuators 104 and the plurality of magnetic heads 102, can be arbitrarily designed.

For example, the first actuator 104*a* may move the magnetic head 102*a* for accessing a front surface of the magnetic disk 101*a*, and the magnetic head 102*b* for accessing a front surface of the magnetic disk 101*b*, and the second actuator 104*b* may move the magnetic head 102*a* for accessing a rear surface of the magnetic disk 101a, and the magnetic head 102b for accessing a rear surface of the magnetic disk 101b.

In another example, the magnetic disk device 1 includes four actuators 104, and each of the four magnetic heads 102 may be moved by different actuators 104 in four actuators 104.

In still another example, the magnetic disk device 1 includes one magnetic disk 101, and the magnetic head 102a disposed on the tip end portion of the first actuator 104a, may access the front surface of the magnetic disk 101, and the magnetic head 102b disposed on the tip end portion of the second actuator 104b, may access the rear surface of the magnetic disk 101.

In still another example, two magnetic heads 102 are capable of accessing the same surface of one magnetic disk 101, and one of the two magnetic heads 102, may be moved by the first actuator 104a, and the other of the two magnetic heads 102, may be moved by the second actuator 104b. In this case, each of the actuators 104 is rotatively driven around different axes 106.

In addition, in the above description, a case where the magnetic disk device 1 receives the data from the host 2 in the access pattern of the sequential write, has been described. In a case where the magnetic disk device 1 receives the data from the host 2 in an access pattern different from the sequential write, the operation as that described above, can be executed.

In addition, a method referred to as shingled magnetic recording (SMR), has been known as a method of writing the data in the magnetic disk 101.

Figure 15:
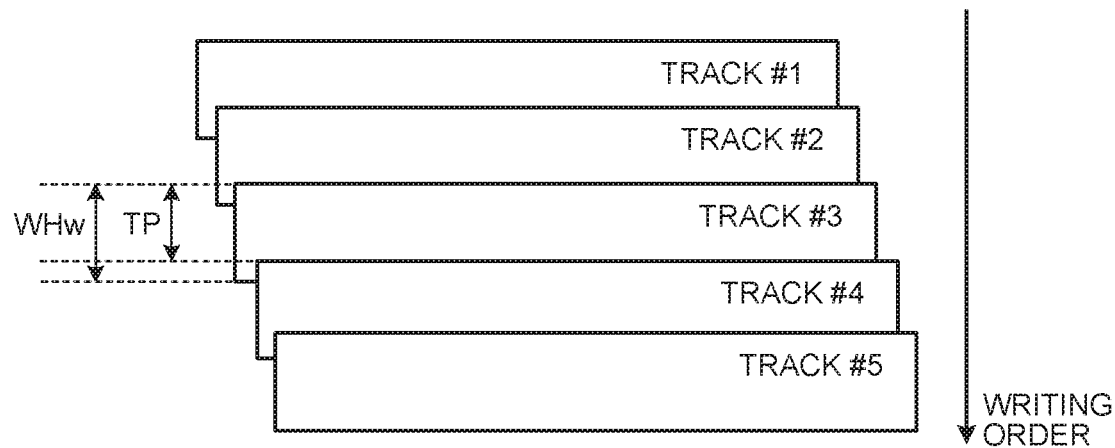
FIG. 15 is a schematic view for describing an SMR method of the embodiment.

FIG. 15 is a schematic view for describing an SMR method of the embodiment. The SMR is a recording method of writing data by the magnetic head 102 (the write element) such that each of the track overlaps with a part of the adjacent track.

For example, a part of a track #2 overlaps with a track #1. In addition, a part of a track #3 overlaps with the track #2. That is, according to the SMR, it is repeated that one track overlaps with a part of the adjacent track in which data has already been written.

Accordingly, a track pitch (TP) of each of the tracks is narrower than a core width (WHw) of the write element of the magnetic head 102. As a result, an improvement in a recording density is realized.

In a case where the SMR is adopted, a plurality of bands is set in a recording region of the magnetic disk 101.

Figure 16:
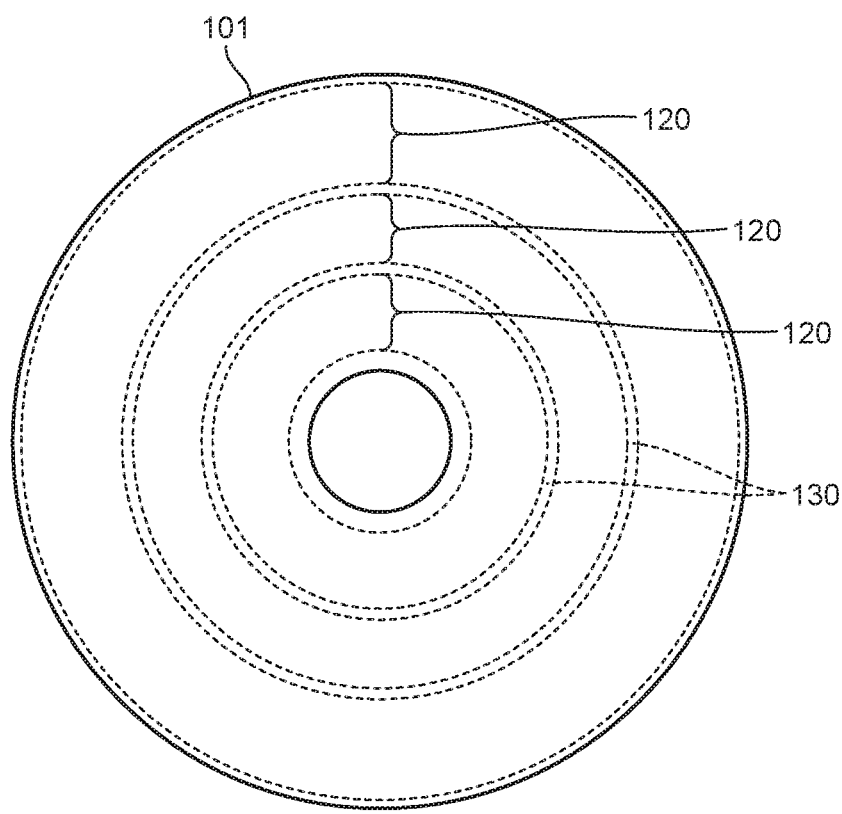
FIG. 16 is a schematic view for describing an example of a plurality of bands of the embodiment.

FIG. 16 is a schematic view for describing an example of a plurality of bands of the embodiment. As illustrated in this drawing, a plurality of bands 120 arranged in a radial direction, is provided in the magnetic disk 101. Each of the bands 120 has a concentric shape. A guard region 130 is allocated between the bands 120. The guard region 130 is a region in which the data is not written. Each of the bands 120 has a width in which the data of the plurality of tracks can be written. In each of the bands 120, the data of the plurality of tracks is written according to the SMR method. The data in the unit of the band 120 is temporally and consecutively written in the magnetic disk 101.

The technology of the embodiment can be applied to a magnetic disk device to which the SMR is applied. In this case, for example, the control circuit 20 is capable of distributing the data in the unit of the band 120, into two bands 120 respectively accessing different actuators 104, in track units. Accordingly, a writing rate and a reading rate of the data in band unit, are improved.

In addition, in the case of the SMR, the data in the band 120, is written such that a part of each of the tracks overlaps with the adjacent track. Accordingly, for example, in a case where a part of the data in the band 120 is required to be updated, all of the data items in the band 120 are to be read out to the buffer memory 24, then the data items in the buffer memory 24 are updated, and then the data items after being updated are written in the magnetic disk 101.

According to a magnetic disk device of the related art including only one actuator, for example, in a case where one band is configured of 100 tracks, it is necessary that data is read out from 100 tracks, the read data is updated, and the updated data is written in 100 tracks of the other band.

In the embodiment, in a case where each of the bands 120 is configured of 50 tracks, and data of one band (data of 100 tracks) is written in two different bands 120 by using two actuators 104a and 104b, each of the actuators 104a and 104b performs the reading of data of 50 tracks and the writing of data of 50 tracks, and thus, the data of one band can be updated. Then, the actuator 104a and the actuator 104b, as described above, can be operated in parallel. The actuator 104a and the actuator 104b execute processing in parallel, at the time of updating band data, and thus, an updating rate of the band data can be improved, compared to the related art.

Furthermore, there is a case where the magnetic disk 101 includes a media cache region, in addition to the band 120. For example, the data that is received from the host 2 and is stored in the buffer memory 24, is written once in the media cache region. The data in the media cache region, is written in a certain band 120 through the buffer memory 24 at a certain timing (for example, a timing when the data of one band is accumulated in the media cache region) or the like. When the control circuit 20 reads out the data of one band in the media cache region to the buffer memory 24, and writes the read data of one band in the magnetic disk 101, the data of one band, read out to the buffer memory 24, may be distributed into two bands 120 of different actuators 104, in track units. The reading from the media cache region to the buffer memory 24, may be executed for each size smaller than the size of one band. That is, when the control circuit 20 writes the data that is received from the host 2 in the buffer memory 24, in the magnetic disk 101 through the media cache region, the data may be distributed into two bands 120 of different actuators 104, in track units.

In addition, in the above description, the control circuit 20 specified the number of writable sectors in one track as the size of the data to be written in the track (track data). There is no need to store the data received from the host 2 in all sectors which are specified as writable sectors For example, the data received from the host 2, is written in the magnetic disk 101 after redundant data such as an error correction code is added. That is, the size of the data written in the magnetic disk 101, is larger than the size of the data received from the host 2, by the redundant data.

In that case, the control circuit 20 obtains the number of writable sectors in the track, and then, obtains a size by subtracting the size of the redundant data from the size of the obtained number of sectors. For example, in a case where the size of the redundant data is the size of one sector, the control circuit 20 specifies the size of the number of sectors obtained by subtracting one from the number of writable sectors in the track, as the size of the track data.

That is, the MPU 26 obtains the number of writable sectors in the track, and then, specifies a size corresponding to the obtained number of sectors, as the size of the track data. The size corresponding to the obtained number of sectors, is the size of data that can be stored in the obtained number of sectors, and does not include the redundant data.

As described above, according to the embodiment, the buffer memory 24 receives the data (first data) from the host 2. The control circuit 20 specifies the number of sectors (the first number of sectors) that are writable sectors written by the first actuator 104a, in a certain track (a first track) (for example, S204 of FIG. 6, and S401 of FIG. 8), and writes data (second data) having a size corresponding to the first number of sectors in the first data, in the first track by using the first actuator 104a (for example, S206 and S207 of FIG. 6, and S402 of FIG. 8). In addition, the control circuit 20 specifies the number of sectors (the second number of sectors) that are writable sectors written by the second actuator 104b, in a track (a second track) different from the first track (for example, S305 of FIG. 7, and S403 of FIG. 8), and writes data (third data) having a size corresponding to the second number of sectors in the first data, in the second track by using the second actuator 104b. The third data is data received subsequent to the second data (for example, S307 and S308 of FIG. 7, and S404 of FIG. 8).

Accordingly, the data received from the host 2 in serial, is distributed into the plurality of actuators 104 in track units. Accordingly, as described above, it is possible to reduce a seek time, compared to the comparative example. That is, it is possible to improve the performance of the magnetic disk device 1.

In addition, according to the embodiment, the control circuit 20 specifies the number of sectors (the third number of sectors) that are writable sectors written by the first actuator 104a, in another track (a third track) (for example, S405 of FIG. 8), and writes data (fourth data) having a size corresponding to the third number of sectors in the first data, in the third track by using the first actuator 104a. The fourth data is data received subsequent to the third data (for example, S406 of FIG. 8).

Accordingly, it is possible to distribute the data received from the host 2 in serial, into two actuators 104 in track units.

In addition, according to the embodiment, the control circuit 20, as described above by using FIG. 8, is capable of starting the writing of the data (the third data) using the second actuator 104b before the writing of the data (the second data) using the first actuator 104a is completed. That is, the first actuator 104a and the second actuator 104b are capable of executing writing in parallel. Accordingly, it is possible to improve the writing rate of the data.

Furthermore, the control circuit 20 specifies the defective sector, and specifies the first number of sectors and the second number of sectors, on the basis of the result of specifying the defective sector.

Accordingly, even in a case where the size of the data that can be written in the target track, is changed according to the number of defective sectors included in the target track, it is possible to accurately obtain the size of the data that can be written in the target track.

In addition, in a case where the first data is requested from the host 2, the control circuit 20 reads out the second data from the first track to the buffer memory 24 by using the first actuator 104a (for example, S604 and S605 of FIG. 10, and S802 of FIG. 12), and reads out the third data from the second track to the buffer memory 24 by using the second actuator 104b (for example, S704 and S705 of FIG. 11, and S806 of FIG. 12). Then, the control circuit 20 outputs the second data and the third data stored in the buffer memory 24, to the host 2, in this order (for example, FIG. 12). That is, in this embodiment, the second data and the third data are output to the host 2, in the order of logical addresses.

Accordingly, it is possible to efficiently execute a reading operation to the magnetic disk 101 using the plurality of actuators 104.

In addition, the control circuit 20 reads out the data (the fourth data) from another track to the buffer memory 24 by using first actuator 104a, after the reading of the second data is completed (for example, S804 of FIG. 12).

Accordingly, it is possible to efficiently execute the reading operation to the magnetic disk 101 using the plurality of actuators 104.

In addition, the control circuit 20 is capable of executing the reading using the first actuator 104a (for example, S802 of FIG. 12) and the reading using the second actuator 104b (for example, S806 of FIG. 12), in parallel.

Accordingly, the reading rate of the data from the magnetic disk 101 is improved, and as a result, reading performance of the magnetic disk device 1 is improved.

In addition, in a case where the recording method of SMR is adopted, the control circuit 20 may distribute the data received from the host 2 in serial, into the band 120 included in the magnetic disk 101a (a first region) and the band 120 included in the magnetic disk 101b (a second region), in track units. That is, the first track is included in the band 120 included in the magnetic disk 101a, and the second track is included in the band 120 included in the magnetic disk 101b.

Accordingly, even in a case where the recording method of SMR is adopted, it is possible to improve the performance of the magnetic disk device 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device, comprising:
   a magnetic disk including a plurality of tracks;
   a first magnetic head;
   a second magnetic head different from the first magnetic head;
   a first actuator that moves the first magnetic head;
   a second actuator that moves the second magnetic head, the second actuator being different from the first actuator;
   a buffer memory that receives first data from a host; and
   a control circuit that writes, in a first track by using the first actuator, second data having a size corresponding to a first number among the first data, and writes, in a second track by using the second actuator, third data having a size corresponding to a second number among the first data, the first track being a track among the plurality of tracks, the second track being, among the plurality of tracks, a track different from the first track, the first number being a number of writable sectors included in the first track, the second number being a number of writable sectors included in the second track, the third data being data received subsequent to the second data,
   wherein the control circuit writes, in a third track by using the first actuator, fourth data having a size corresponding to a third number among the first data, the third track being, among the plurality of tracks, a track different from any of the first track and the second track, the third number being a number of writable sectors included in the third track, the fourth data being data received subsequent to the third data.

2. The magnetic disk device according to claim 1, wherein the control circuit starts the writing of the third data before the writing of the second data is completed.

3. The magnetic disk device according to claim 1, wherein the control circuit specifies a defective sector, and specifies the first number and the second number based on a result of specifying the defective sector.

4. The magnetic disk device according to claim 1, wherein in a case where the first data is requested from the host, the control circuit reads out the second data from the first track to the buffer memory by using the first actuator, reads out the third data from the second track to the buffer memory by using the second actuator, and outputs the second data and the third data stored in the buffer memory, to the host in an order of the second data and the third data.

5. The magnetic disk device according to claim 4, wherein the control circuit reads out the fourth data from the third track to the buffer memory by using the first actuator, after the reading of the second data is completed.

6. The magnetic disk device according to claim 4, wherein the control circuit executes the reading of the second data and the reading of the third data in parallel.

7. The magnetic disk device according to claim 1, wherein the first data is stored in the buffer memory from the host in a logical address order, and
a logical address of a lead of the third data is subsequent to a logical address of a tail of the second data.

8. A method of controlling a magnetic disk device including a magnetic disk including a plurality of tracks, a first magnetic head, a second magnetic head different from the first magnetic head, a first actuator that moves the first magnetic head, a second actuator that moves the second magnetic head, the second actuator being different from the first actuator, and a buffer memory that receives first data from a host, the method comprising:
writing, in a first track by using the first actuator, second data having a size corresponding to a first number among the first data, the first track being a track among the plurality of tracks, the first number being a number of writable sectors included in the first track;
writing, in a second track by using the second actuator, third data having a size corresponding to the second number among the first data, the second track being, among the plurality of tracks, a track different from the first track, the second number being a number of writable sectors included in the second track, the third data being data received subsequent to the second data; and
writing, in a third track by using the first actuator, fourth data having a size corresponding to a third number among the first data, the third track being, among the plurality of tracks, a track different from any of the first track and the second track, the third number being a number of writable sectors included in the third track, the fourth data being data received subsequent to the third data.

9. The method according to claim 8, further comprising:
starting the writing of the third data before the writing of the second data is completed.

10. The method according to claim 8, further comprising specifying a defective sector, and specifying the first number and the second number based on a result of specifying the defective sector.

11. The method according to claim 8, further comprising:
reading out second data from the first track to the buffer memory by using the first actuator, reading out the third data from the second track to the buffer memory by using the second actuator, and outputting the second data and the third data stored in the buffer memory, to the host in an order of the second data and the third data, in a case where the first data is requested from the host.

12. The method according to claim 11, further comprising:
reading out the fourth data from the third track to the buffer memory by using the first actuator, after the reading of the second data is completed.

13. The method according to claim 11, further comprising:
executing the reading of the second data and the reading of the third data in parallel.

* * * * *